United States Patent
Lindsay

(10) Patent No.: US 8,746,772 B2
(45) Date of Patent: Jun. 10, 2014

(54) SEATING ASSEMBLY FOR A VEHICLE

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 161 days.

(21) Appl. No.: 13/331,366

(22) Filed: Dec. 20, 2011

(65) Prior Publication Data

US 2013/0154332 A1    Jun. 20, 2013

(51) Int. Cl.
   *B60N 2/20*    (2006.01)
(52) U.S. Cl.
   USPC ................................ 296/65.16; 297/354.1
(58) Field of Classification Search
   USPC ......... 296/63, 64, 65.01, 65.05, 65.09, 65.16; 297/354.1, 354.11, 378.1, 378.13, 383
   See application file for complete search history.

(56) References Cited

U.S. PATENT DOCUMENTS

| | | | |
|---|---|---|---|
| 4,368,916 A | 1/1983 | Blasin | |
| 4,637,648 A * | 1/1987 | Okino et al. | 296/63 |
| 4,840,427 A | 6/1989 | Hong | |
| 5,979,985 A | 11/1999 | Bauer et al. | |
| 6,234,553 B1 | 5/2001 | Eschelbach et al. | |
| 6,964,452 B2 | 11/2005 | Kammerer | |
| 7,252,337 B2 * | 8/2007 | Hofmann et al. | 297/383 |
| 7,367,625 B2 * | 5/2008 | Mori et al. | 297/378.12 |
| 7,419,218 B2 * | 9/2008 | Holdampf et al. | 297/378.12 |
| 7,568,764 B2 | 8/2009 | Harper et al. | |
| 7,731,288 B2 | 6/2010 | Ventura et al. | |
| 7,775,599 B2 | 8/2010 | George et al. | |
| 2003/0160475 A1 * | 8/2003 | Tohda et al. | 296/124 |
| 2006/0103228 A1 * | 5/2006 | Gupta et al. | 297/452.65 |

\* cited by examiner

*Primary Examiner* — Jason S Morrow
*Assistant Examiner* — E Turner Hicks
(74) *Attorney, Agent, or Firm* — Rankin, Hill & Clark LLP

(57) ABSTRACT

A seating assembly for a vehicle including a vehicle body having a floor and a laterally extending dividing wall for separating a passenger compartment from a rear storage compartment. A rear seat includes a seat base defining a seat surface and a seat back. The seat back is adjustable relative to the seat base between an upright, seated position and a folded position where the seat back is positioned on the seat base. A lever arrangement pivotally connects the seat back to one of the body and the dividing wall. The lever arrangement is configured to enable the seat back to be folded down and to move the seat back in a vehicle longitudinal direction relative to the seat base toward the dividing wall so that at least a portion of the seat back protrudes rearwardly past the dividing wall and into the rear storage compartment.

18 Claims, 4 Drawing Sheets

SEATING ASSEMBLY FOR A VEHICLE

BACKGROUND

Exemplary embodiments herein generally relate to a seating assembly for a vehicle, and more particularly, to a rear seating assembly including a four-bar linkage which allows the seating assembly to be easily adjusted to enhance cargo storage within the vehicle.

A typical seating assembly for a vehicle includes a rear seat having a seat base and a seat back. In order to increase the space in the storage compartment behind the known rear seat, the seat back may be folded downwardly in the direction of the seat base. It is desirable to fold the seat back completely down on the seat base such that a rear surface of the seat back is generally parallel with the storage compartment floor. A typical folding rear seat for a sedan or coupe employs a simple pivot which only allows the seat back to swing in a circular arc downwardly toward the seat base. In many instances, the head rest provided on the folding rear seat back can collide with the front seat, particularly in compact vehicles or when the front seat is in an extreme rear position or reclined. This sometimes requires the removal of the headrest or expensive/heavy folding headrest mechanisms.

BRIEF DESCRIPTION

In accordance with one aspect, a seating assembly for a vehicle comprises a vehicle body having a floor and a laterally extending dividing wall. The dividing wall is configured to separate a passenger compartment from a rear storage compartment. A rear seat includes a seat base and a seat back. The seat base defines a seat surface for supporting a seat occupant. The seat back is adjustable relative to the seat base between an upright, seated position where the seat back is oriented substantially perpendicular to the seat base and a folded position where the seat back is in opposing face-to-face relation with the seat base. A lever arrangement is configured to pivotally connect the seat back to the body. The lever arrangement is configured to enable the seat back to be folded down and to move the seat back in a vehicle longitudinal direction relative to the seat base toward the dividing wall so that at least a portion of the seat back protrudes rearwardly past the dividing wall and into the rear storage compartment.

In accordance with another aspect, a seating assembly for a vehicle comprises a vehicle body having a floor and a laterally extending rear bulkhead configured to separate a passenger compartment from a rear storage compartment. A front seat is connected to the vehicle body. A rear seat is connected to the vehicle body and includes a seat base defining a seat surface for supporting a seat occupant and a seat back. The seat back is adjustable relative to the seat base between an upright, seated position where the seat back is oriented substantially perpendicular to the seat base and a folded position where the seat back is in opposing face-to-face relation with the seat base. The seat back is not connected to the seat base. A high latch locking assembly releasably secures the seat back of the rear seat to the vehicle body in the upright position. A four-bar linkage separate from the seat base and is configured to pivotally connect the seat back to the body. The four-bar linkage defines a pivotal axis for the seat back. As the seat back is moved toward the folded position, the pivotal axis is moved toward the rear bulkhead thereby moving the seat back in a non-circular curve. The four-bar linkage enables the seat back to be folded down onto the seat base and simultaneously moves the seat back in a vehicle longitudinal direction relative to the seat base toward the rear bulkhead so that at least a portion of the seat back protrudes past the rear bulkhead and into the rear storage compartment.

In accordance with another aspect, a seating assembly for a vehicle comprises a vehicle body and a seat connected to the vehicle body. The seat includes a seat base and a seat back. The seat base defines a seat surface for supporting a seat occupant. The seat base is fixedly and non-movably connected to the vehicle body. The seat back is adjustable relative to the seat base between an upright, seated position and a folded position where the seat back is in opposing face-to-face relation with the seat base. A high latch locking assembly comprises a seat latch mounted to the seat back and a striker mounted to the vehicle body for releasably securing the seat back to the vehicle body in the upright position. A lever arrangement is configured to pivotally connect the seat back to the vehicle body. The lever arrangement is configured to enable the seat back to be folded down onto the seat base and to move the seat back in a vehicle longitudinal direction relative to the seat base.

DETAILED DESCRIPTION

It should, of course, be understood that the description and drawings herein are merely illustrative and that various modifications and changes can be made in the structures disclosed without departing from the present disclosure. In general, the figures of the exemplary four-bar linkage, high-latch folding seatback are not to scale. It will be appreciated that the various identified components of the exemplary four-bar linkage, high-latch folding seatback disclosed herein are merely terms of art that may vary from one manufacturer to another and should not be deemed to limit the present disclosure.

Figure 1:
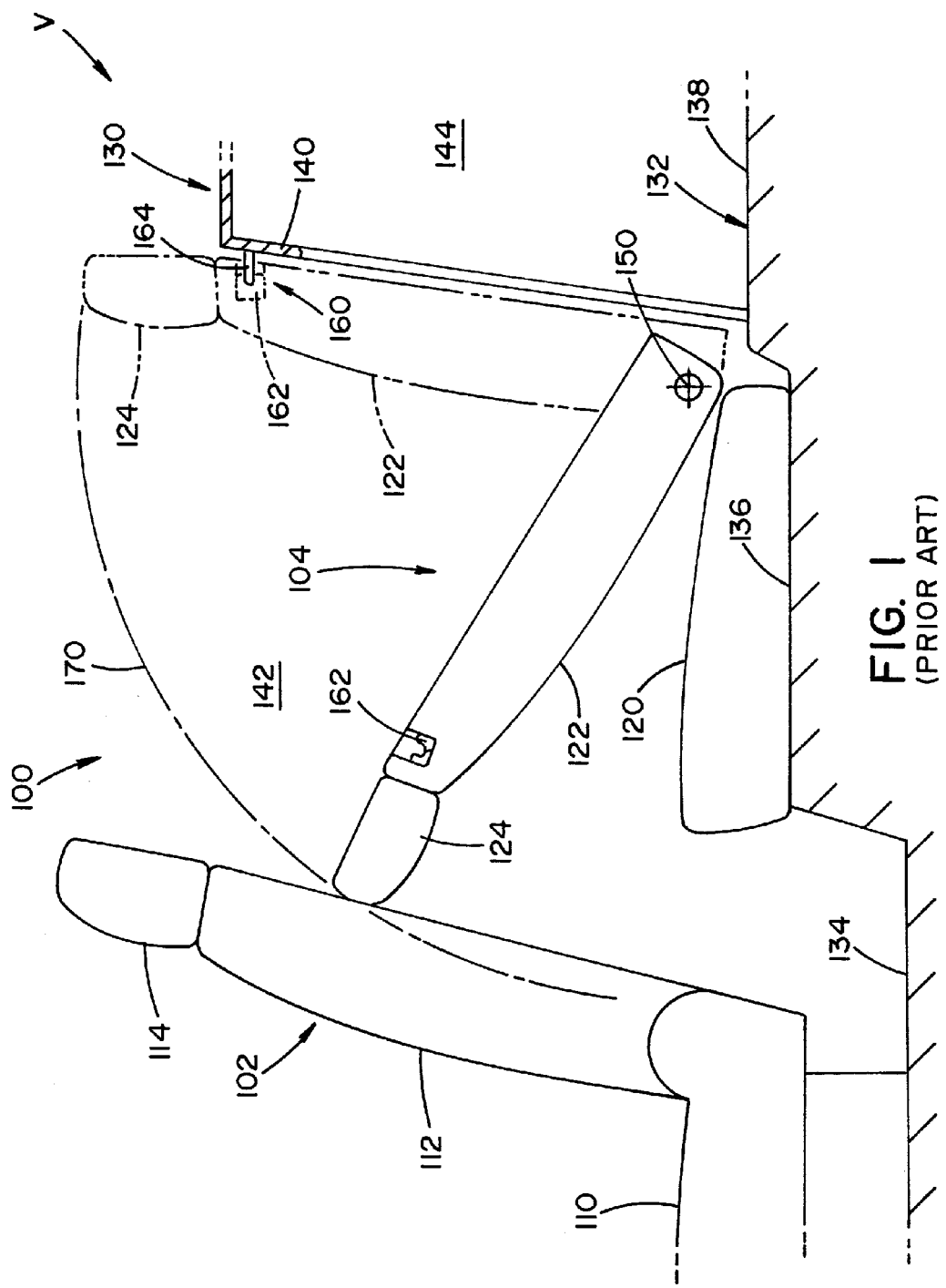
FIG. 1 is a schematic view of a known seating assembly. The known seating assembly includes a front seat and a rear seat having a seat base and a seat back. The seat back engages the front seat as the seat back is being folded downwardly toward the seat base.

Referring now to the drawings, wherein like numerals refer to like parts throughout the several views, FIG. 1 schematically illustrates a known seating assembly 100 for a vehicle V. The known vehicle seating assembly 100 generally comprises at least one front seat 102 and at least one rear seat 104. The front seat 102 includes a seat base or seat cushion 110 and a seat back 112 having a head rest 114 mounted thereto. Similarly, the rear seat 104 includes a seat base or seat cushion 120 and a seat back 122. An integrated head rest 124 is fixedly mounted to the seat back 122. The term "integrated" means that components of the head rest 124 (e.g., trim, foam, and supporting structure) are an extension of the seat back 122. The rear seat 104 can be a split-bench/split-back type seat; though alternative seat configurations, such as bench-type seats or separated captain-type seats, are contemplated. Each of the front seat 102 and rear seat 104 is coupled to a body 130 of the vehicle.

As shown, the vehicle body 130 includes a floor 132 which can have a series of generally horizontally disposed platforms that are placed at various levels. These platforms include a generally horizontally disposed first platform 134, a second horizontally disposed platform 136, and a third horizontally disposed platform 138 that extends behind the rear seat assembly 104. The first platform 134 provides a surface on which the vehicle front seat 102 is mounted. For passengers sitting in the rear seat 104, the first platform can serve as a foot well upon which a passenger can rest his legs or feet. The second platform 136 provides a surface on which the rear seat 104 is mounted. The second platform 136 can be raised, relative to the level of the first platform, although this is not required. The third platform 138 is raised relative to the level of the second platform 130 (though this is not required), and generally defines the level of the cargo carrying floor of the vehicle V. The illustrated platforms 134, 136, 138 of the floor 132 are by way of example only and thus need not be limited to what is shown herein. The vehicle body 132 further includes a rear bulkhead 140. The rear bulkhead 140 can be a laterally extending dividing wall and will be referred to hereafter as a dividing wall. As shown, the dividing wall is connected to the vehicle floor 132; although, it should be appreciated that the dividing wall can be separate from the floor 132. The dividing wall 140 is configured to separate a passenger compartment 142 from a rear storage compartment 144. As illustrated, the vehicle V is one of a sedan-type or coupe-type vehicle. The storage compartment is a trunk compartment, and the rear seat 104 in the folded position provides limited access to the trunk compartment from the passenger compartment.

As indicated above, the rear seat 104 includes the seat base or seat cushion 120 for supporting a seat occupant and a seat back 122. It should be appreciated that terms "seat base" and "seat cushion" refer to the entire component, including the structure (frame) of the seat base and its upholstery. Likewise the term "seat back" refers to both the seat frame and the upholstery of seat back 122. The seat base 120 is fixedly mounted on the second platform 136 of the vehicle floor. The seat base 120 and the seat back 122 are pivotably attached to one another at a fixed pivot point 150 defined in a lower portion of the seat back 122 via a pivoting mechanism (not shown) as is known in the art. With this known arrangement, the seat back 122 is adjustable relative to the seat base 120 between an upright, seated position where the seat back 122 is oriented substantially perpendicular to the seat base 120 and a folded position where the seat back is moved toward the seat base.

Figure 2:
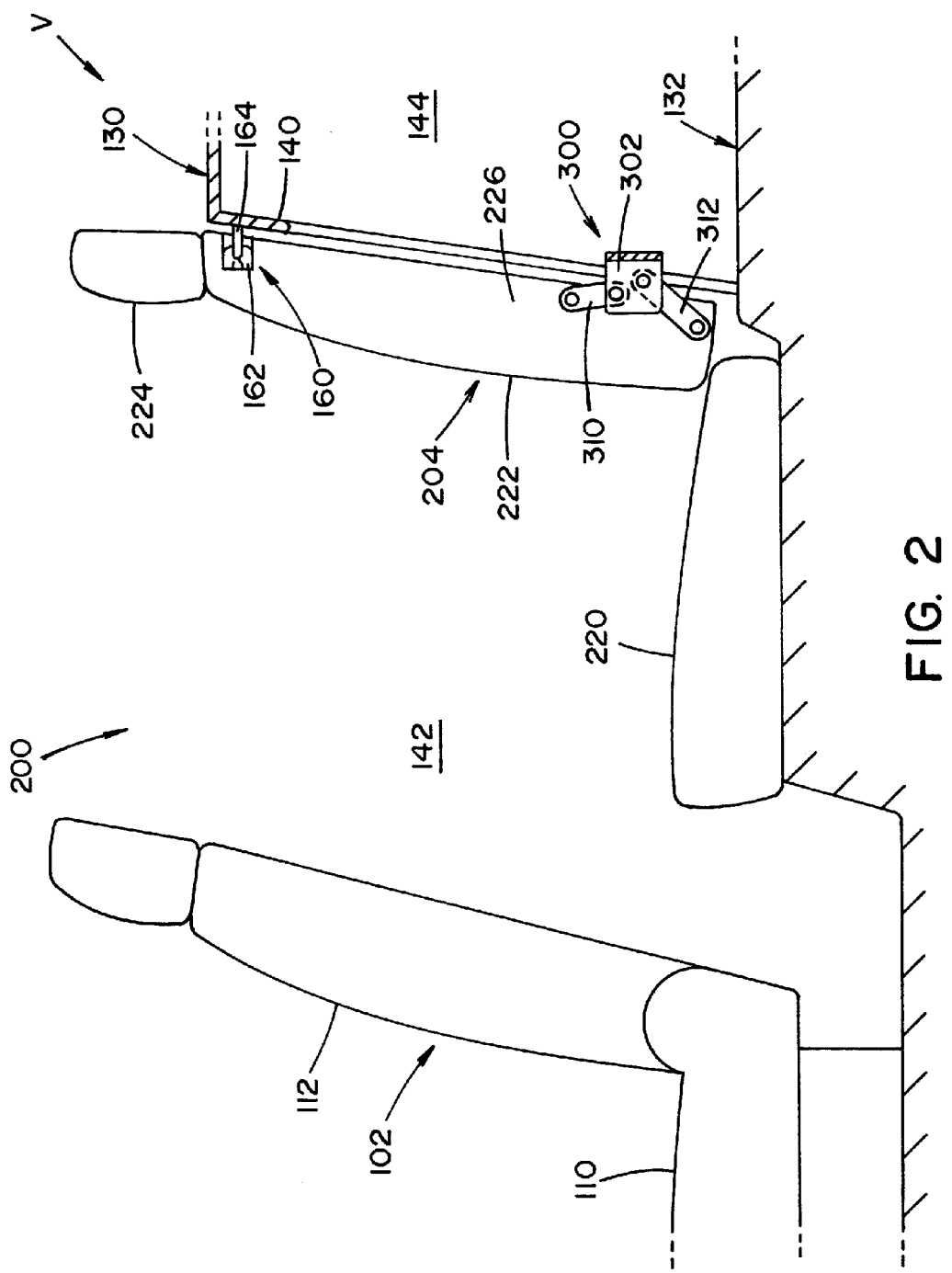
FIGS. 2 and 3 are schematic views of an exemplary seating assembly according to the present disclosure. The seating assembly includes a front seat and a rear seat having a seat base and a seat back. An exemplary lever arrangement allows adjustment of the seat back relative to the seat base between an upright, seated position where the seat back is oriented substantially perpendicular to the seat base and a folded position where the seat back is in opposing face-to-face relation with the seat base.
Figure 3:
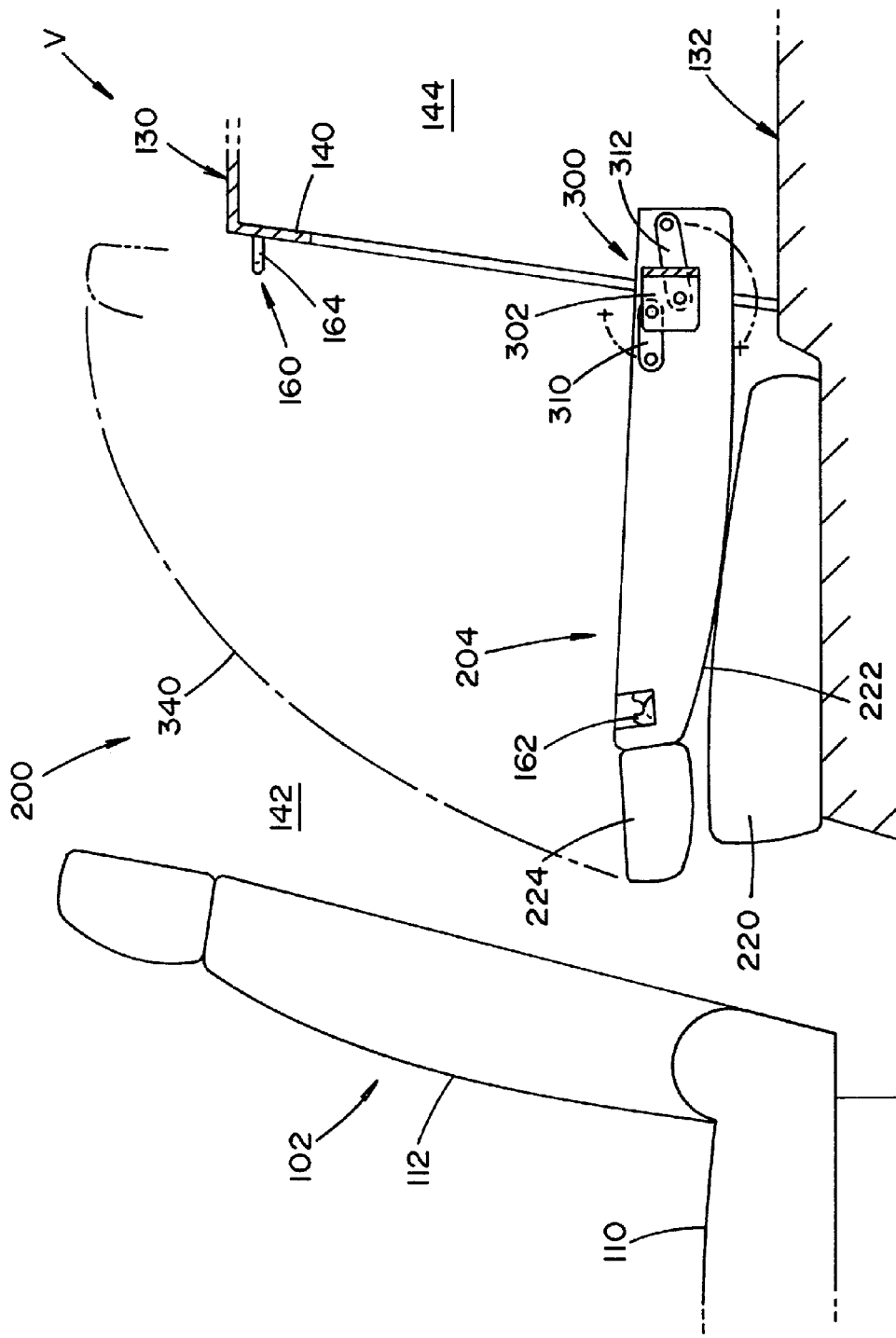

The rear seat 122 further includes a high latch locking assembly 160 for releasably securing the seat back 122 to the vehicle body 130 in the upright position. The assembly 160 includes a seat latch 162 mounted to the back side of the seat back 122 and a striker or similar retaining member 164 mounted on the vehicle body 130. When the rear seat 104 is in its upright position (as depicted by the hidden lines in FIG. 1), the seat latch 162 is releasably engaged to the striker 164. The engagement holds the seat back 122 in the upright position relative to the seat base 120. Actuation of the assembly 160 allows the pivotable movement of the seatback 122 from the upright position toward the seat base about the fixed pivot point 150. However, because the pivot point 150 is fixed, the seat back 122 swings in a circular arc (illustrated through the curve 170 shown in dash-dotted lines in FIG. 1 which indicates the movement of the head rest 124 on pivoting the seat back 122 about the fixed pivot point 150). Therefore, when folding the back rest 122 of the rear seat 104 forwards, there is the problem that the top side of one of the back rest 122 or the head rest 124 provided thereon collides with the seat back 112 of the front seat 102. This prevents full access to the storage compartment 144 from within the passenger compartment 142 and limits the cargo storage within the vehicle. This also means that the seat back 122 can only then be folded down onto the seat base 120 if the head restraint 124 is removed With reference now to FIGS. 2-5, an exemplary seating assembly 200 for the vehicle V according to the present disclosure is illustrated. As set forth above, the vehicle V includes the vehicle body 130 having the floor 132 and the laterally extending dividing wall 140 connected to the floor. The dividing wall 140 is configured to separate the passenger compartment 142 from the rear storage compartment 144. As illustrated, the vehicle V is one of a sedan-type or coupe-type vehicle, and the storage compartment 144 is a trunk compartment. Although, it should be appreciate that the exemplary seating assembly 200 can be implemented in other types of vehicles, such as vehicles without the dividing wall/rear bulkhead, including vans and sport utility vehicles. The seating assembly 200 includes the front seat 102 and a rear seat 204. The rear seat 204 includes a seat base 220 defining a seat surface for supporting a seat occupant and a seat back 222. An integrated head rest 224 is mounted to the seat back. The seat base 220 is fixedly and non-movably connected to the vehicle floor 132 forward of the dividing wall 140. The seat back 222, which is not connected to the seat base, is adjustable relative to the seat base 220 between an upright, seated position where the seat back is oriented substantially perpendicular to the seat base (FIG. 2) and a folded position where the seat back is in opposing face-to-face relation with the seat base (FIG. 3).

The seating assembly 200 further includes a lever arrangement 300 configured to pivotally connect a lower portion of the seat back 222 to the body 130. The lever arrangement 300 is separate from the seat base 220 such that the lever arrangement is not connected to the seat base. In the depicted embodiment, the lever arrangement 300 is located above the seat base 220 and connects the seat back to a sidewall 302 of the vehicle body, the sidewall being disposed adjacent to an outboard side 226 of the seat back. As will be discussed in greater detail below, the lever arrangement 300 enables the seat back 222 to be folded down onto the seat base 220 and simultaneously moves the seat back 222 in a vehicle longitudinal direction relative to the seat base 220 toward the dividing wall 140 so that at least a portion of the seat back protrudes past the dividing wall and into the rear storage compartment 144. In other words, a pivotal axis defined by the lever arrangement 300 about which the seat back 222 is pivoted as it is folded forwards onto the seat base 220 is moved as the seat back is folded forwards so that there can be no collision between the one of the seat back 222 or head rest 224 and the front seat 102.

Figure 4:
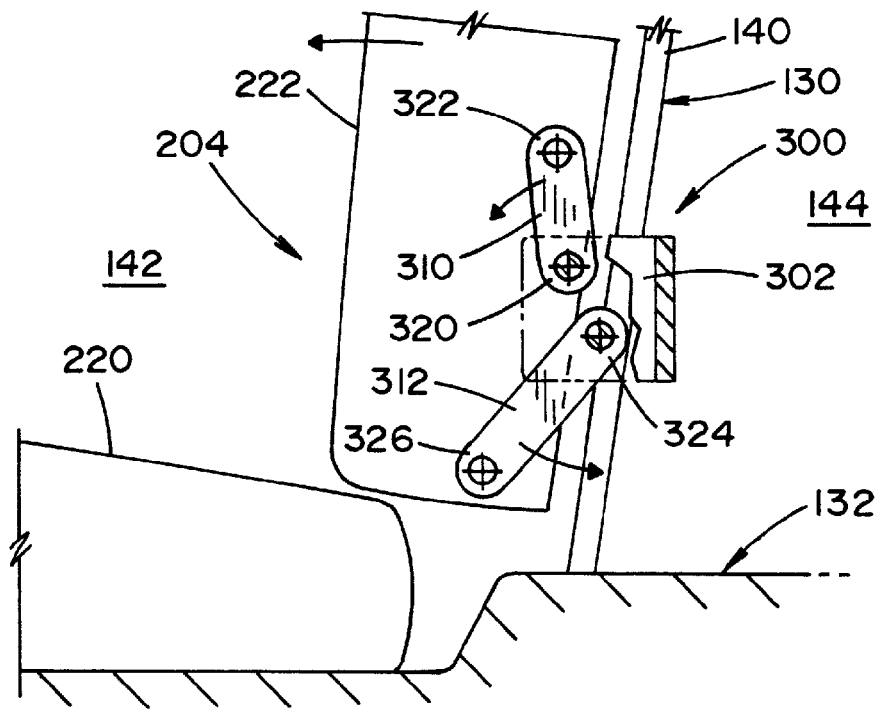
FIG. 4 is an enlarged schematic view of the lever arrangement depicted in FIG. 2.
Figure 5:
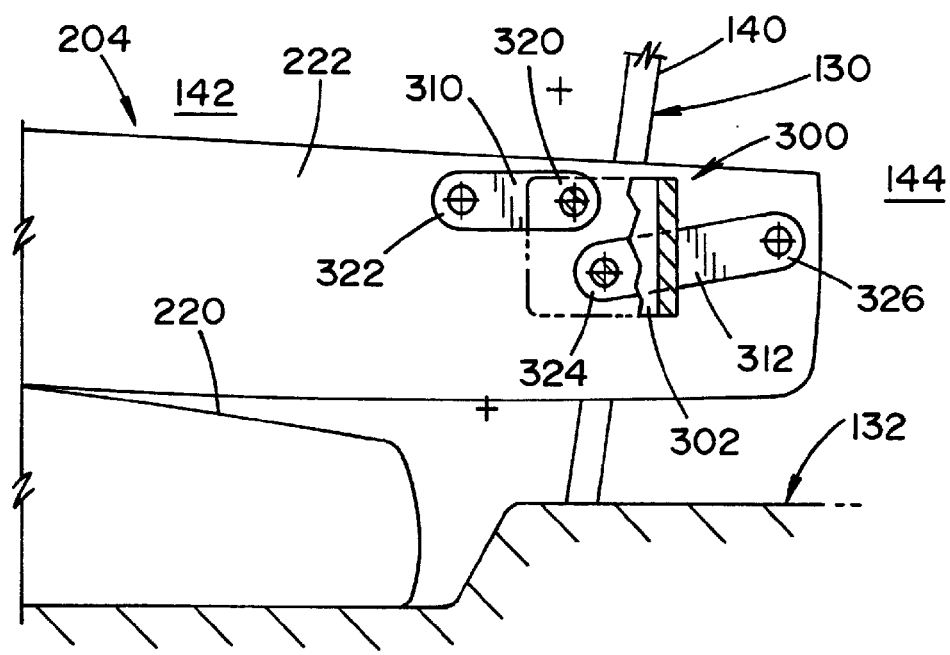
FIG. 5 is an enlarged schematic view of the lever arrangement depicted in FIG. 3.

The lever arrangement 300 is configured as a four-bar linkage including a first lever 310 and a second lever 312 spaced from the first lever. With particular reference to FIGS. 4 and 5, the first lever 310 includes a first end portion 320 pivotally connected to the sidewall 302 of the vehicle body 130 and a second end portion 322 pivotally connected to the seat back 222. Similarly, the second lever 312 includes a first end portion 324 pivotally connected to the sidewall 302 of the vehicle body 130 and a second end portion 326 pivotally connected to the seat back 222. As depicted, a length of the first lever 310 is shorter than a length of the second lever 312. It should be appreciated that the orientation of the first and second levers 310,312 allows for the rearward movement of the seat back 222 as the seat back is moved toward the folded position. Particularly, the first end portion 320 of the first lever 310 is both vertically offset and offset in a forward direction from the first end portion 324 of the second lever 312, and the first end portion 320 of the first lever is spaced farther from the dividing wall 140 than the first end portion 324 of the second lever. In the upright position of the seat back 222, the first lever 310 extends upwardly away from the seat base 220 and the second lever 312 extends downwardly toward the seat base. As the seat back 222 is moved toward the folded position, the first lever 310 rotates in a forward direction and the second lever 312 rotates in a rearward direction. In the folded position of the seat back 222, the first lever 310 and the second lever 312 extend substantially parallel to the seat base 220 with the second end portion 326 of the second lever 312 extending into the storage compartment 144.

As indicated above, the lever arrangement 300 enables the seat back 222 to move in a vehicle longitudinal direction relative to the seat base 220 toward the dividing wall 140. To that end, the lever arrangement 300 defines the pivotal axis for the seat back 222. As shown in FIG. 3, as the seat back is moved toward the folded position, the pivotal axis is moved toward the dividing wall 140 thereby moving the seat back in a non-circular curve (illustrated through the curve 340 shown in dash-dotted lines in FIG. 3 which indicates the movement of the head rest 224 on pivoting the seat back 222 via the lever arrangement 300). It can be seen that on folding the seat back 222 forwards the pivotal axis defined by the lever arrangement is moved upwards (along the vertical vehicle axis) and backwards (rearwardly along the longitudinal axis of the vehicle). The corrected curve 340 is shifted relative to the original curve 170 slightly upwards and slightly backwards. This prevents the head rest 224 from colliding with the seat back 112 of the front seat 102. This, in turn, reduces an extension of the seat back 222 and head rest 224 toward the front seat 102 during folding of the seat back onto the seat base 220.

With reference back to FIGS. 2 and 3, similar to rear seat 104, the high latch locking assembly 160 releasably secures the seat back 222 to the vehicle body 130 in the upright position. The seat latch 162 is mounted to the back side of the seat back 222 and the striker 164 mounted on the vehicle body 130. In the upright position of the seat back, the seat latch 162 releasably engages the striker 164 thereby holding the seat back 222 in the upright position. Actuation of the assembly 160 allows the pivotable movement of the seatback 222 from the upright position toward the folded position about the pivotal axis defined by the lever arrangement 300. In contrast to the rear seat 104, the rear seat 204 in the folded position provides full access to the trunk compartment 144 from the passenger compartment 142 and additional storage space is achieved thereby providing the user with expanded cargo space inside the vehicle.

As is evident from the foregoing, the present disclosure provides a four-bar linkage pivot rather than a simple pivot which allows the seat back 222 to swing in a non-circular curve. The four-bar linkage connects the seat back 222 to the vehicle body 130. As the seat back 222 is moved toward the seat base 220, the four-bar linkage allows the seat back to be pulled into the trunk/cargo carrying space 144. This reduces the extension of the rear seat back 222 toward the front seat 102 during folding of the seat back into a cargo-mode (pass-through mode). With the proposed design, expensive/heavy folding headrest mechanisms or inconvenient headrest removal by the customer can be avoided, and more economical/lighter integrated headrests can be implemented.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A seating assembly for a vehicle comprising:
    a vehicle body having a floor and a laterally extending dividing wall configured to separate a passenger compartment from a rear storage compartment;
    a rear seat including a seat base defining a seat surface for supporting a seat occupant and a seat back adjustable relative to the seat base between an upright, seated position where the seat back is oriented substantially perpendicular to the seat base and a folded position where the seat back is in opposing face-to-face relation with the seat base; and
    a lever arrangement configured to pivotally connect the seat back to the vehicle body, the lever arrangement configured to enable the seat back to be folded down onto the seat base and to move the seat back in a vehicle longitudinal direction relative to the seat base toward the dividing wall so that at least a portion of the seat back protrudes rearwardly past the dividing wall and into the rear storage compartment,
    wherein the lever arrangement is a four-bar linkage including a first lever and a second lever spaced from the first lever, the first lever including a first end portion pivotally connected to the vehicle body and a second end portion pivotally connected to the seat back, the second lever including a first end portion pivotally connected to the vehicle body and a second end portion pivotally connected to the seat back, wherein the lever arrangement is located above the seat base,
    wherein in the upright position of the seat back, the first lever extends upwardly away from the seat base and the second lever extends downwardly toward the seat base, as the seat back is moved toward the folded position, the first lever rotates in a forward direction away from the dividing wall and the second lever rotates in a rearward direction toward the dividing wall, and in the folded position of the seat back, the first lever and the second lever extend substantially parallel to the seat base.

2. The seating assembly of claim 1, wherein the seat base is fixedly and non-movably connected to the vehicle floor forward of the dividing wall, and the seat back is not directly connected to the seat base.

3. The seating assembly of claim 2, wherein the lever arrangement is separate from the seat base such that the lever arrangement is not directly connected to the seat base.

4. The seating assembly of claim 3, wherein the seat back includes an outboard side disposed adjacent to a sidewall of the vehicle body, the lever arrangement connecting the seat back to the sidewall.

5. The seating assembly of claim 1, wherein the first end portion of the first lever is vertically offset from the first end portion of the second lever, and the first end portion of the first lever is spaced farther from the dividing wall than the first end portion of the second lever.

6. The seating assembly of claim 5, wherein a length of the first lever is shorter than a length of the second lever.

7. The seating assembly of claim 1, wherein the lever arrangement defines a pivotal axis for the seat back, wherein as the seat back is moved toward the folded position the pivotal axis is moved toward the dividing wall thereby moving the seat back in a non-circular curve.

8. The seating assembly of claim 7, wherein seat back includes an integrated head rest, the lever arrangement being configured to reduce an extension of the seat back and head rest toward a front seat during folding of the seat back onto the seat base.

9. The seating assembly of claim 1, further including a high latch locking assembly for releasably securing the seat back to the vehicle body in the upright position.

10. The seating assembly of claim 1, wherein the vehicle is one of a sedan-type or coupe-type vehicle, the storage compartment is a trunk compartment, and the seat back in the folded position provides access to the trunk compartment from the passenger compartment.

11. A seating assembly for a vehicle comprising:
a vehicle body having a floor and a rear bulkhead configured to separate a passenger compartment from a rear storage compartment;
a front seat connected to the vehicle body;
a rear seat connected to the vehicle body, the rear seat including a seat base defining a seat surface for supporting a seat occupant and a seat back adjustable relative to the seat base between an upright, seated position where the seat back is oriented substantially perpendicular to the seat base and a folded position where the seat back is in opposing face-to-face relation with the seat base, the seat back is not directly connected to the seat base;
a high latch locking assembly for releasably securing the seat back of the rear seat to the vehicle body in the upright position; and
a four-bar linkage separate from the seat base and configured to pivotally connect the seat back to the body, the four-bar linkage defining a pivotal axis for the seat back, wherein as the seat back is moved toward the folded position the pivotal axis is moved toward the rear bulkhead thereby moving the seat back in a non-circular curve, wherein the four-bar linkage enables the seat back to be folded down onto the seat base and simultaneously moves the seat back in a vehicle longitudinal direction relative to the seat base toward the rear bulkhead so that at least a portion of the seat back protrudes past the rear bulkhead and into the rear storage compartment, wherein the four-bar linkage includes a first lever and a second lever spaced from the first lever, as the seat back is moved toward the folded position, the first lever rotating in a forward direction toward the front seat and the second lever rotating in a rearward direction toward the rear bulkhead.

12. The seating assembly of claim 11, wherein the seat base is fixedly and non-movably connected to the vehicle floor and the four-bar linkage is not directly connected to the seat base.

13. The seating assembly of claim 11, wherein the first lever includes a first end portion pivotally connected to the vehicle body and a second end portion pivotally connected to the seat back, and the second lever includes a first end portion pivotally connected to the vehicle body and a second end portion pivotally connected to the seat back.

14. The seating assembly of claim 13, wherein the four-bar linkage connects a lower portion of the seat back to the vehicle body, the second end portion of the second lever extending into the rear storage compartment in the folded position of the seat back.

15. The seating assembly of claim 13, wherein the first end portion of the first lever is offset in a forward direction from the first end portion of the second lever, and in the upright position of the seat back, the first lever extends upwardly away from the seat base and the second lever extends downwardly toward the seat base, and in the folded position of the seat back, the first lever and the second lever extend substantially parallel to the seat base.

16. The seating assembly of claim 15, wherein the first end portion of the first lever is vertically offset from the first end portion of the second lever.

17. The seating assembly of claim 13, wherein a length of the first lever is shorter than a length of the second lever.

18. A seating assembly for a vehicle comprising:
a vehicle body;
a seat connected to the vehicle body, the seat including a seat base defining a seat surface for supporting a seat occupant, the seat base fixedly and non-movably connected to the vehicle body, and a seat back adjustable relative to the seat base between an upright, seated position and a folded position where the seat back is in opposing face-to-face relation with the seat base;
a high latch locking assembly comprising a seat latch mounted to the seat back and a striker mounted to the vehicle body for releasably securing the seat back to the vehicle body in the upright position; and
a lever arrangement configured to pivotally connect the seat back to the vehicle body, the lever arrangement configured to enable the seat back to be folded down onto the seat base and to move the seat back in a vehicle longitudinal direction relative to the seat base,
wherein the lever arrangement is a four-bar linkage including a first lever and a second lever spaced from the first lever, the first lever including a first end portion pivotally connected to the vehicle body and a second end portion pivotally connected to the seat back, the second lever including a first end portion pivotally connected to the vehicle body and a second end portion pivotally connected to the seat back,
wherein in the upright position of the seat back, the first lever extends upwardly away from the seat base such that the first end portion of the first lever is located below the second end portion of the first lever and the second lever extends downwardly toward the seat base such that the first end portion of the second lever is located above the second end portion of the second lever,
wherein as the seat back is moved toward the folded position, the first lever rotates in a forward direction away from the dividing wall and the second lever rotates in a rearward direction toward the dividing wall.

* * * * *